United States Patent Office 3,783,084
Patented Jan. 1, 1974

3,783,084
SOUND SUPPRESSING DOUBLE-GLAZED PANE
Rudolf Quenett, Cadolzburg, Germany, assignor to Flachglas Aktiengesellschaft Delog-Detag, Furth, Bavaria, Germany
Filed July 26, 1971, Ser. No. 165,474
Claims priority, application Germany, July 15, 1970, P 20 34 998.8
Int. Cl. B32b 1/04, 3/02
U.S. Cl. 161—45                                                7 Claims

ABSTRACT OF THE DISCLOSURE

A sound suppressing double-glazed pane comprises two glazing sheets which are spaced apart and connected to each other at their edge by a sealing section. At least one of the glazing sheets is of laminated construction and comprises a plurality of individual glass sheets each joined to the adjacent individual sheet or sheets by an intermediate lamina of visco-elastic material, the total thickness or structure of the visco-elastic laminae being sufficient to provide a high degree of internal damping in the laminated glazing sheet. The laminated glazing sheet may comprise two individual sheets joined by a single lamina of polyvinyl butyral or three or more individual sheets joined together by two or more laminae of polyvinyl butyral. In each case the two or more polyvinyl butyral films of the usual thickness of 0.38 mm. are used to provide the desired thickness of polyvinyl butyral in the laminated glazing sheet.

BACKGROUND OF THE INVENTION

This invention relates to a sound suppressing double-glazed pane comprising two glazing sheets which are spaced apart and connected to each other at their edge by a sealing section.

It is already known to apply a strip of sound absorbing material adjacent to the sheet edge in the space between the sheets of a double-glazed pane in order to improve sound suppression (Federal German patent specification No. 1,073,162).

Panes which exhibit a high degree of sound suppression in the lower frequency range between 100 and 400 Hz. are also required for special purposes. Double-glazed panes with this kind of sound suppression may be obtained, in accordance with an earlier proposal of the applicant by a special construction of the sealing section which joins the glass sheets to each other and which is filled with the sound absorbing material, the distance between the sheets being additionally increased from approximately 10 to approximately 100 mm. Panes of this kind have been found reliable particularly in transmitter rooms and audio studios. In view of constantly increasing road noise it is however desirable to achieve sound suppression in the aforementioned low frequency range even in office buildings, schools and hotels which cannot however be glazed with sheets spaced at the aforementioned distance.

The invention therefore aims to provide a solution to the problem of achieving, in a double-glazed pane with a normal spacing of 10 to 20 mm., the same improvement in sound suppression as is provided by panes having the previously proposed improved sealing section and increased spacing between the sheets. Such a pane with normal spacing between its sheets can be installed without difficulties into window frames of conventional construction. In particular, the invention aims to provide an improvement of sound suppression in the frequency range between 100 and 400 Hz.

SUMMARY OF THE INVENTION

According to the invention, this problem is solved in that at least one of the sheets of the double-glazed pane is of laminated construction and comprises a plurality of individual sheets each joined to the adjacent individual sheet or sheets by means of an intermediate lamina consisting of visco-elastic material, preferably polyvinyl butyral, the greater thickness or the structure of the intermediate lamina or laminae providing a higher degree of internal damping than a normal intermediate lamina in a safety glass sheet.

In a preferred embodiment, the intermediate lamina or laminae comprise two or more polyvinyl butyral films each of the usual thickness of 0.38 mm., so that a total intermediate lamina thickness of 0.76 mm. is obtained when using two such films and a total intermediate lamina thickness of 1.14 mm. is obtained when using three such films.

To improve sound suppression in a pane including a sheet which is not of laminated construction, it is advisable for the non-laminated sheet to be constructed as a thick sheet of sheet glass or plate glass.

Sound suppression may be improved still further by means of an edge seal of moltoprene or by means of another sound absorbing edge seal for the sheets.

BRIEF DESCRIPTION OF DRAWING

Further objects and advantages of the invention will become apparent from the following detailed description of certain preferred embodiment, given by way of example with reference to the appended drawings, in which.

DESCRIPTION OF PREFERRED EMBODIMENTS

Figure 1:
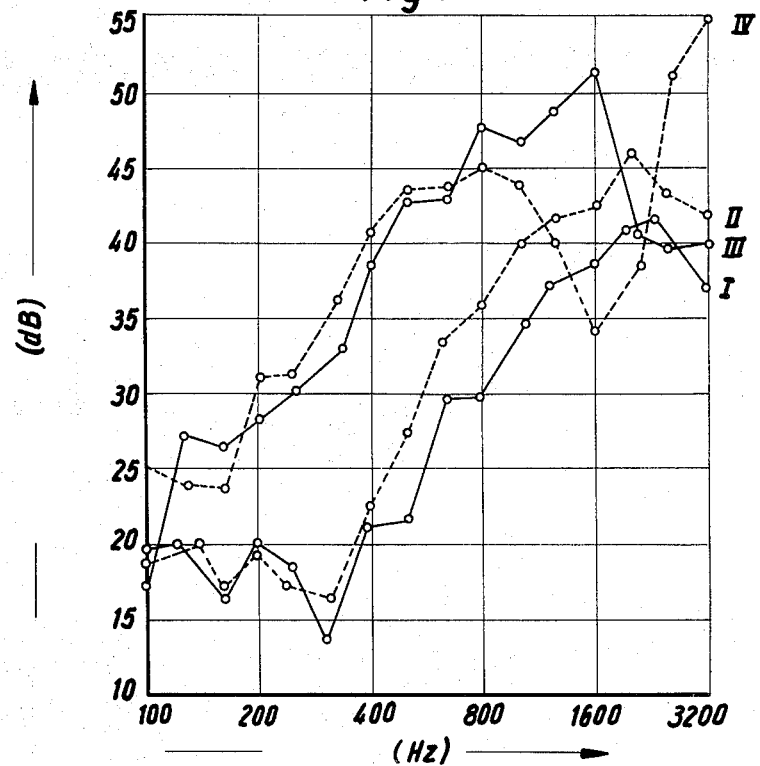
FIG. 1 is a graph on which are plotted the sound absorption values of various types of double-glazed panes.

In the graph shown in FIG. 1, the frequency of sound incident on a double-glazed pane is plotted in Hertz along the abscissa and the resulting reduction in transmitted sound in decibels is plotted along the ordinate. Sound absorption values hereinbelow refer to a sound incidence direction of 45°. The curve designated I shows the sound suppression obtained from a double-glazed pane comprising two glass sheets of 4 mm. thickness spaced at a distance of 8 mm. A double-glazed pane, constructed in identical manner but including a 3 cm. thick strip of sound absorbing material at its edge has a substantially improved sound suppression in the frequency range above 400 Hz., as shown in curve II. However, the sound suppression of both the double-glazed panes in the lower frequency range of 100 to 400 Hz. is still unsatisfactory. The curve designated III illustrates the sound suppression achieved using a double-glazed pane comprising two individual sheets, each having a thickness of 5.5 mm., the sheets being spaced at a distance of 100 mm. from each other and having an improved sound absorbing edge section. As shown by the curve, this double glass pane has a substantially improved sound suppression performance in the relevant frequency range covering 100 to 400 Hz.

Figure 4:
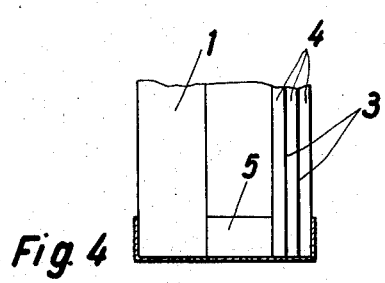

It is surprisingly found that in the frequency range between 100 and 400 Hz. the average sound suppression exhibited by a double-glazed pane according to the invention and with a sheet spacing of only 12 mm., is equally as good as that given by the pane represented by curve III. The pane of the invention comprises one sheet of plate glass of 12 mm. thickness, the other sheet consisting of 3 glass sheets of 3 mm. thickness joined to each other by means of two intermediate laminae. The sound suppression of this pane is shown by the curve designated IV and illustrates the progress achieved with the invention. The construction of the pane corresponding to curve IV of the graph is illustrated in FIG. 4 and will be described in more detail below.

Figure 2:
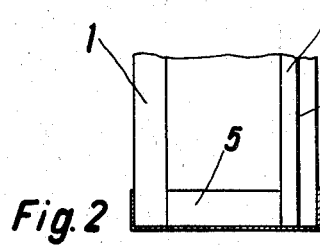
FIGS. 2 to 5 are fragmentary cross-sectional views of various double-glazed panes embodying the invention.

FIG. 2 shows in diagrammatic form a part section through a first double-glazed pane embodying the invention, one sheet of the pane comprising a glass sheet 1 of 6 mm. thickness and the other sheet comprising a laminated safety glass sheet. The laminated safety glass sheet is constructed from two individual glass sheets 4 of 3 mm. thickness, joined to each other by means of an intermediate lamina 3. The intermediate lamina 3 comprises three polyvinyl butyral films, each of 0.38 thickness, and therefore has an overall thickness of 1.14 mm. The sheets are retained at their edges by means of a sealing section.

The surprising improvement of sound absorption achieved with this pane, is due to the fact that the visco-elastic polyvinyl butyral lamina 3 has a substantial degree of internal damping. It is clear that when using another material which, owing to its molecular structure and its colloid structure has a higher degree of damping than polyvinyl butyral in the range of acoustic frequencies, in particular in the range between 100 and 400 Hz., lesser laminar thicknesses of the intermediate lamina 3 would be sufficient to achieve the desired effect. Sound suppression at the edge of the double-glazed pane illustrated in FIG. 2 may be improved in known manner by means of a strip 5 of sound absorbing material disposed in the space between the sheets to extend peripherally and adjacent to the edge section.

Figure 3:
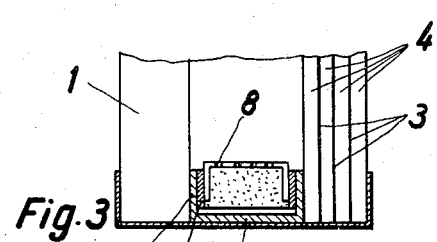

In the double-glazed pane illustrated in FIG. 3, one sheet consists of a thick glass sheet 1 of 12 mm. thickness while the other sheet consists of a laminated safety glass sheet comprising four thin glass sheets 4 with intermediate laminae 3 of polyvinyl butyral, each of 0.76 mm. thickness, disposed therebetween. To improve edge damping, the edge mounting is so constructed that the flanges of a U-section 6, which extends as a spacer into the space between the sheets, are joined to the sheet edges by means of an elastic adhesive film 7. An inner U-section 8, containing a sound suppressing film, is received in the section 6 and joined by means of foam rubber laminae 9 to the flanges of the section 6. The U-section 8, which is inverted with respect to the U-section 6, has its web part provided with slits.

The double-glazed pane illustrated in FIG. 4 is that for which the sound suppression curve IV was plotted in FIG. 1. One sheet of this double-glazed pane comprises a thick glass sheet 1 of 12 mm. thickness while the other sheet is constructed as a laminated safety glass sheet comprising three individual glass sheets 4, each of 3 mm. thickness. The intermediate laminae 3 comprise two polyvinyl butyral films of 0.38 mm. thickness, and therefore have a total thickness of 0.76 mm. A strip 5 of sound absorbing material extends peripherally around the pane in the same way as in the embodiment illustrated in FIG. 2.

Figure 5:
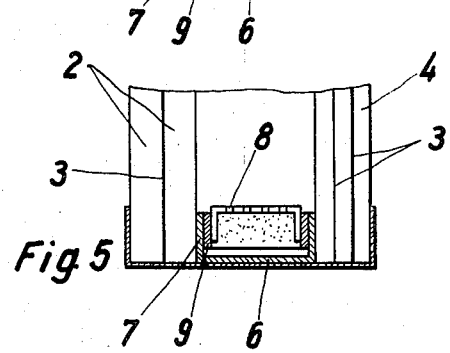

In the embodiment illustrated in FIG. 5, both sheets of the double-glazed pane are constructed of laminated safety glass. The left-hand laminated safety glass sheet has two thick glass sheets 2, each of 6 mm. thickness, joined to each other by means of an intermediate lamina 3 of visco-elastic material with a high degree of internal damping. The right-hand laminated safety glass sheet comprises three individual glass sheets 4, each of 3 mm. thickness, joined to each other by means of two visco-elastic intermediate laminae 3. The left-hand lamina 3 of the right-hand laminated safety glass sheet is thinner than the right-hand intermediate lamina 3. A sound suppressing section, corresponding to that in FIG. 3, is disposed at the edge of the pane.

The table hereinbelow lists the sound suppression obtained with a number of double-glazed panes embodying the invention and contrasts such suppression with that obtained with conventional panes. A first sheet of the double-glazed panes in each case comprises of a thick glass sheet of 12 mm. thickness while laminated safety glass sheets of different construction are used for the second sheet in the panes embodying the invention. The distance between sheets in all cases amounts to 12 mm.

| Construction of the second sheet of the double glass pane | Number of PVB film of 0.38 mm. thickness | Mean sound suppression in the range between 100 and 3,200 Hz. at an angle of 45°, db |
| --- | --- | --- |
| Window glass: | | |
| 4 mm | 0 | 32 |
| 12 mm | 0 | 32 |
| Laminated safety glass: | | |
| Two individual sheets, 3 mm | 3 | 36 |
| Two individual sheets, 2 mm | 3 | 36 |
| Three individual sheets, 3 mm | 4 | 38 |
| Three individual sheets, 2 mm | 4 | 40 |
| Four individual sheets, 2 mm | 6 | 41 |

The table indicates that the sound suppression of the inventive double-glazed pane improves with the use of increasing numbers of polyvinyl butyral films each of 0.38 mm. thickness in the laminated safety glass sheet. Sound suppression is also improved if the individual glass sheets employed in the laminated safety glass sheet are as thin as possible. The use of individual sheets of only 1 to 1.5 mm. thickness for the laminated safety glass sheet indicates that a further increase of sound suppression may be expected. An improved sound suppression may also be achieved if a laminated member with a core comprising a plurality of films of visco-elastic material, preferably polyvinyl butyral is incorporated into the double glass pane instead of a laminated safety glass pane being provided, only the covering sheets being constructed of silicate glass. It is also possible to envisage the replacement of a double-glazed pane with an insulating glass sheet having more than two sheet elements of the kind employed for the purpose of increased heat insulation.

I claim:

1. A sound suppressing double-glazed pane, comprising a first glazing sheet; a second glazing sheet spaced from said first glazing sheet, at least one of said first and second glazing sheets being of laminated construction; sealing section means connecting the first and second glazing sheets together at their edge; a plurality of individual glass sheets in each glazing sheet of laminated construction; an intermediate lamina of visco-elastic material joining each said individual glass sheet to an adjacent individual sheet in each glazing sheet of laminated construction, said lamina providing a high degree of internal damping in each glazing sheet of laminated construction, and said sealing section means including a U-shaped section disposed between said first and second glazing sheets and being open towards the interior of the pane and having its flanges joined by an elastic adhesive film to the edges of said glazing sheets, the space between the flanges of said U-shaped section being filled with sound absorbing material and being closed by a perforated cover joined to the flanges of said U-shaped section by foam rubber retaining means.

2. A double-glazed pane as claimed in claim 1, including a laminated glazing sheet which has one intermediate lamina comprising at least two polyvinyl butyral films each having a thickness of 0.38 mm.

3. A double-glazed pane as claimed in claim 1, including a laminated glazing sheet which has a plurality of intermediate laminae together comprising at least two polyvinyl butyral films each having a thickness of 0.38 mm.

4. A double-glazed pane as claimed in claim 1, including a strip of a sound absorbing material peripherally disposed in the space between the said first and second glazing sheets adjacent said sealing section means.

5. A double-glazed pane as claimed in claim 1, in which one of said first and second glazing sheets is a non-laminated sheet glass which is substantially thicker than the individual glass sheets of the laminated glazing sheet.

6. A double-glazed pane with improved sound insulation characteristics, particularly in the frequency range of 100 to 400 Hz., comprising
  (a) two sheets of glass spaced from each other a distance of 10–20 mm.,
  (b) sealing means interconnecting said sheets along the marginal portions thereof,
  (c) at least one of said sheets being a laminated safety glass comprising at least two individual glass sheets, and
  (d) an intermediate lamina of a visco-elastic material covering the entire areas of facing surfaces of said individual glass sheets of the safety glass and comprising at least two polyvinyl butyral films having a combined thickness of at least twice the standard thickness of 0.38 mm.

7. A double-glazed pane as claimed in claim 6, in which one of said two sheets of glass comprises a non-laminated sheet glass which is substantially thicker than the individual glass sheets of the laminated safety glass.

References Cited
UNITED STATES PATENTS

| | | | |
|---|---|---|---|
| 2,409,808 | 10/1946 | Sowle | 52—616 X |
| 3,343,317 | 9/1967 | Cripe | 52—616 X |

WILLIAM A. POWELL, Primary Examiner

U.S. Cl. X.R.

52—616; 156—107; 161—199